United States Patent
Moriya et al.

(10) Patent No.: US 6,214,934 B1
(45) Date of Patent: Apr. 10, 2001

(54) POLYPROPYLENE RESIN COMPOSITION FOR USE IN AUTOMOTIVE INNER AND OUTER TRIMS

(75) Inventors: Satoru Moriya; Akira Todo, both of Kuga-gun; Ikunori Sakai, Sakai; Takao Nomura, Toyota; Takeyoshi Nishio, Okazaki, all of (JP)

(73) Assignees: Mitsui Chemicals Inc; Grand Polymer Co. Ltd, both of Tokyo; Toyota Jidosha Kabushiki Kaisha, Aichi-ken, all of (JP)

( * ) Notice: Subject to any disclaimer, the term of this patent is extended or adjusted under 35 U.S.C. 154(b) by 0 days.

(21) Appl. No.: 09/084,392

(22) Filed: May 27, 1998

(30) Foreign Application Priority Data

May 28, 1997 (JP) .................................................. 9-138778

(51) Int. Cl.[7] .............................. C08J 3/00; C08K 3/34; C08L 53/00; C08L 9/00; C08L 47/00
(52) U.S. Cl. ......................... 525/89; 524/451; 524/505; 525/86; 525/88; 525/98
(58) Field of Search ................................. 525/89, 98, 86, 525/88; 524/505, 451

(56) References Cited

U.S. PATENT DOCUMENTS

| | | | |
|---|---|---|---|
| 4,737,536 | 4/1988 | Kawase et al. | 524/451 |
| 4,914,155 | 4/1990 | Shimomura et al. | 525/89 |
| 5,086,109 | 2/1992 | Ueno et al. | 524/496 |
| 5,247,003 | * 9/1993 | Terada et al. | 524/451 |
| 5,283,267 | 2/1994 | Nishio et al. | 523/216 |
| 5,532,309 | 7/1996 | Fukui et al. | 524/451 |
| 5,543,454 | 8/1996 | Kamakura et al. | 524/451 |
| 5,880,198 | 3/1999 | Kobayashi et al. | |

FOREIGN PATENT DOCUMENTS

| | | |
|---|---|---|
| 24861 | 10/1998 | (AU) . |
| 0430490 | 6/1991 | (EP) . |
| 0571817 | 12/1993 | (EP) . |
| 0634453 | 1/1995 | (EP) . |
| 0636650 | 2/1995 | (EP) . |
| 0697435 | 2/1996 | (EP) . |
| 697435 | 2/1996 | (EP) . |
| 739940 | 10/1996 | (EP) . |
| 0778314 | 6/1997 | (EP) . |
| 0794225 | 9/1997 | (EP) . |
| 216490 | 1/1986 | (GB) . |
| 2281302 | 3/1995 | (GB) . |
| 58-168649 | 10/1983 | (JP) . |
| 63-150343 | 6/1988 | (JP) . |
| 05051500 | 3/1993 | (JP) . |
| 05331330 | 12/1993 | (JP) . |
| 06179785 | 6/1994 | (JP) . |
| 07033919 | 2/1995 | (JP) . |
| 08020690 | 1/1996 | (JP) . |
| 08176395 | 7/1996 | (JP) . |

* cited by examiner

Primary Examiner—Patrick D. Niland

(57) ABSTRACT

A polypropylene resin composition for use in automotive inner and outer trims, comprising 50 to 85% by weight of a crystalline polypropylene (A) having an MFR (230° C.) of 7 to 70 g/10 min, 2 to 16% by weight of a hydrogenated block copolymer (B) obtained by hydrogenating at a hydrogenation ratio of at least 90% an aromatic vinyl/conjugated diene block copolymer which contains an aromatic vinyl block polymer unit in an amount of 22% by weight or less and has an MFR (230° C.) of at least 5 g/10 min, and 5 to 25% by weight of an inorganic filler (G) having an average particle size of 0.1 to 3 μm as essential components. This composition may contain, as optional components, another hydrogenated block copolymer (C), an aromatic hydrocarbon copolymer (D), a crystalline polyethylene (E) and a soft ethylene/α-olefin copolymer (F). This composition is excellent in heat resistance, rigidity and impact resistance and can provide a molding having beautiful appearance.

21 Claims, No Drawings

POLYPROPYLENE RESIN COMPOSITION FOR USE IN AUTOMOTIVE INNER AND OUTER TRIMS

FIELD OF THE INVENTION

The present invention relates to a polypropylene resin composition for use in automotive inner and outer trims, which is excellent in rigidity and impact resistance and can provide a molding having beautiful appearance.

BACKGROUND OF THE INVENTION

The polypropylene resin is excellent in rigidity, hardness and heat resistance and can be easily molded into desired shape by any of various techniques such as injection molding, calendering and extrusion. Further, the polypropylene resin is cheap. Therefore, the polypropylene resin is widely used in automotive interior parts (automotive inner trims) such as an instrumental panel, a trim and a pillar, and automotive exterior parts (automotive outer trims) such as a fender, a bumper, a side moul, a mud guard and a mirror cover.

In the application of the polypropylene resin to the above uses, it is common practice to prepare, in accordance with the intended use, polypropylene resin compositions with desired properties by compounding polypropylene resin with a high-pressure polyethylene, a soft polymer or rubber component such as polyisobutylene, polybutadiene and ethylene/propylene copolymer (EPR), an inorganic filler, etc.

Specifically, it is known to utilize, for example, a reinforced polypropylene resin composition comprising polypropylene (crystalline ethylene/propylene block copolymer) and an inorganic filler in which an ethylene/α-olefin copolymer rubber is contained as a soft polymer or rubber component (Japanese Patent Laid-open Publication No. 59(1983)-168649) and compositions containing hydrogenated block copolymer rubbers and/or ethylene/propylene copolymer rubbers (Japanese Patent Laid-open Publication Nos. 3(1991)-172339, 61(1986)-12742, 61(1986)-291247, 63(1988)-150343 and 4(1992)-57848).

It is required that the above polypropylene resin compositions have further enhanced properties. For example, in the use in automotive inner trims, improvements of the rigidity, impact resistance and heat resistance of the polypropylene resin compositions are demanded for realizing the reduction of the thickness and weight of the inner trims. Molding composed of the polypropylene resin compositions can be brought to practical use in unpainted form if flow marks and weld are not noticeable and if the polypropylene resin compositions are excellent in appearance and scratch resistance.

For example, as a polypropylene resin composition having improved rigidity, heat resistance (thermal deformation resistance), impact resistance and appearance, a polypropylene resin composition comprising a crystalline polypropylene, a hydrogenated block copolymer with a high styrene component content, a hydrogenated block copolymer with a high conjugated diene (hydrogenated) unit content and talc was proposed in Japanese Patent Laid-open Publication No. 8(1996)-20684. However, it is demanded that the composition described in this publication be improved in impact resistance and molding appearance.

The inventors have conducted extensive and intensive studies with a view toward obtaining a polypropylene resin composition satisfying the above performance requirements.

As a result, it has been found that a polypropylene resin composition obtained from a crystalline polypropylene, a product of hydrogenation of aromatic vinyl/conjugated diene block copolymer and an inorganic filler having an average particle size as small as 0.1 to 3 $\mu$m optionally together with an aromatic hydrocarbon copolymer, a crystalline polyethylene and a soft ethylene/α-olefin copolymer is excellent in rigidity and heat resistance and is endowed with high impact resistance and appearance enhancing effect. The present invention has been completed on the basis of this finding.

OBJECT OF THE INVENTION

The object of the present invention is to provide a polypropylene resin composition for use in automotive inner and outer trims, which is excellent in rigidity, heat resistance and impact resistance and which can produce moldings with beautiful appearance.

SUMMARY OF THE INVENTION

The polypropylene resin composition for use in automotive inner and outer trims according to the present invention comprises:

50 to 85% by weight of a crystalline polypropylene (A) having a melt flow rate (230° C. under a load of 2.16 kg) of 7 to 70 g/10 min, 2 to 16% by weight of a hydrogenated block copolymer (B) obtained by hydrogenating at a hydrogenation ratio of at least 90% an aromatic vinyl/conjugated diene block copolymer which contains an aromatic vinyl block polymer unit derived from an aromatic vinyl in an amount of 22% by weight or less and has a melt flow rate (230° C. under a load of 2.16 kg) of at least 5 g/10 min, 0 to 16% by weight of a hydrogenated block copolymer (C) obtained by hydrogenating at a hydrogenation ratio of at least 90% an aromatic vinyl/conjugated diene block copolymer which contains an aromatic vinyl block polymer unit derived from an aromatic vinyl in an amount of at least 25% by weight and has a melt flow rate (230° C. under a load of 2.16 kg) of 10 g/10 min or less, 0 to 10% by weight of an aromatic hydrocarbon copolymer (D), 0 to 10% by weight of a crystalline polyethylene (E), 0 to 10% by weight of a soft ethylene/α-olefin, copolymer (F), and 5 to 25% by weight of an inorganic filler (G) having an average particle size of 0.1 to 3 $\mu$m.

The above crystalline polypropylene (A) is preferably a crystalline ethylene/propylene block copolymer, said crystalline ethylene/propylene block copolymer containing ethylene units in an amount of 0.5 to 8 mol % and containing a 23° C. n-decane insoluble component exhibiting a ratio of isotactic pentad of at least 0.970. It is preferred that this crystalline ethylene/propylene block copolymer contains in an amount of 4 to 20% by weight the 23° C. n-decane soluble component, said 23° C. n-decane soluble component containing ethylene units in an amount of 20 to 45 mol % and having an intrinsic viscosity [η] measured in 135° C. decalin of at least 4 dl/g.

The above aromatic hydrocarbon copolymer (D) is preferably a polystyrene having a melt flow rate (230° C. under a load of 2.16 kg) of 0.5 to 100 g/10 min.

The crystalline polyethylene (E) can be any of ethylene homopolymer, ethylene/1-butene copolymer, ethylene/1- hexene copolymer, ethylene/4-methyl-1-pentene copolymer and ethylene/1-octene copolymer, these homopolymer and copolymers having a density of 0.895 to 0.975 g/cm$^3$ and a melt flow rate (190° C. under a load of 2.16 kg) of 0.5 to 70 g/10 min.

The soft ethylene/α-olefin copolymer (F) can be any of ethylene/propylene copolymer, ethylene/1-butene copolymer, ethylene/1-hexene copolymer and ethylene/1-octene copolymer, these copolymers having a density ranging from 0.860 to less than 0.895 g/cm$^3$ and a melt flow rate (190° C. under a load of 2.16 kg) of 0.5 to 30 g/10 min.

In the present invention, it is preferred that the inorganic filler (G) be talc.

DETAILED DESCRIPTION OF THE INVENTION

The polypropylene resin composition of the present invention comprises as essential components a crystalline polypropylene (A), a hydrogenated block copolymer (B) which is a product of hydrogenation of an aromatic vinyl/conjugated diene block copolymer and an inorganic filler (G) having an average particle size of 0.1 to 3 μm. Furthermore, according to necessity, the polypropylene resin composition of the present invention may contain as optional components a hydrogenated block copolymer (C), an aromatic hydrocarbon copolymer (D), a crystalline polyethylene (E) and a soft ethylene/α-olefin copolymer (F).

Each of the above components will be described below.

Crystalline Polypropylene (A)

The crystalline polypropylene (A) for use in the present invention has a melt flow rate (MFR, measured at 230° C. under a load of 2.16 kg in accordance with ASTM D1238) of 7 to 70 g/10 min, preferably, 15 to 65 g/10 min and, still preferably, 20 to 65 g/10 min.

In the present invention, common polypropylenes can be used without any particular limitation as long as they are crystalline polypropylenes having the above melt flow rate value. This crystalline polypropylene (A) may be homopolypropylene or a copolymer of propylene and another α-olefin. This copolymer may be a block copolymer or a random copolymer. The production process is also not particularly limited. However, homopolypropylene and/or a propylene block copolymer is preferably used.

With respect to the crystallinity of the polypropylene (A), when the polypropylene (A) is, for example, homopolypropylene, the ratio of isotactic pentad of a 23° C. n-decane insoluble component [I$_5$] thereof preferably ranges from 0.95 to 0.99, still preferably, from 0.97 to 0.99. This pentad isotacticity can be determined from $^{13}$C-NMR of the 23° C. n-decane insoluble component according to the customary method.

The crystalline polypropylene (A) preferably contains a 23° C. n-decane soluble component in an amount of 0.1 to 25% by weight, particularly 0.1 to 20% by weight, especially 0.1 to 15% by weight.

The amount of the 23° C. n-decane soluble component contained in the crystalline polypropylene (A) is measured by the following method.

3 g of sample (polypropylene), 20 mg of 2,6-di-tert-butyl-4-methylphenol and 500 ml of n-decane are placed in a 1 liter flask and heated at 145° C. to thereby effect a dissolution. After the dissolution, the solution is cooled to 23° C. over a period of 8 hr and maintained at 23° C. for 8 hr. Precipitated solid is separated from the n-decane solution containing dissolved polymer by filtration through a glass filter. The liquid phase is dried in vacuum at 150° C. until a constant weight is attained, and the weight is measured. The amount of the 23° C. n-decane soluble component contained in the crystalline polypropylene is calculated from the thus obtained amount of dissolved polymer as a percentage to the weight of the sample.

When the crystalline polypropylene (A) is an ethylene/propylene block copolymer, it is preferred that ethylene units be contained therein in an amount of 0.5 to 8 mol %, especially, 1 to 7 mol %.

The ratio of isotactic pentad of the 23° C. n-decane insoluble component thereof is preferably at least 0.970, still preferably, at least 0.980.

This block copolymer preferably contains the 23° C. n-decane soluble component in an amount of 4 to 20% by weight, still preferably, 4 to 15% by weight.

This 23° C. n-decane soluble component preferably contains ethylene units in an amount of 20 to 45 mol %, still preferably, 30 to 45 mol % and preferably has an intrinsic viscosity [η], measured in 135° C. decalin, of at least 4 dl/g, still preferably, from 6 to 10 dl/g.

The ethylene unit content can be determined from $^{13}$C-NMR according to the customary method.

This crystalline polypropylene (A) has a crystallinity, measured by X-ray diffractometry, of, generally, at least 56%, preferably, at least 60% and, still preferably, 65 to 95%.

It is preferred that the above crystalline polypropylene (A) contain 3-methyl-1-pentene polymer and the like as prepolymers from the viewpoint that the rate of crystallization is high.

In the present invention, at least two types of crystalline polypropylenes (A) mentioned above can be used in combination.

Hydrogenated Block Copolymer (B)

The hydrogenated block copolymer (B) for use in the present invention is a product of hydrogenation of an aromatic vinyl/conjugated diene block copolymer comprising a block polymer unit (X) derived from an aromatic vinyl and a block polymer unit (Y) derived from a conjugated diene.

The aromatic vinyl/conjugated diene block copolymer with the above construction is in the form of, for example, X(YX)$_n$ or (XY)$_n$ wherein n is an integer of 1 or larger.

Of these, the form of X(YX)$_n$, especially, X-Y-X is preferred. Specifically, a polystyrene-polybutadiene (or polyisoprene or polyisoprene/butadiene)-polystyrene block copolymer is preferred.

In the above styrene block copolymer, the aromatic vinyl block polymer units (X) as hard segments are present as crosslink points for the conjugated diene rubber block polymer unit (Y) to thereby form a physical crosslink (domain). The conjugated diene rubber block polymer unit (Y) which is present between the aromatic vinyl block polymer units (X) is a soft segment and possesses a rubber elasticity.

Examples of aromatic vinyls which form the above block polymer units (X) include styrene, α-methylstyrene, 3-methylstyrene, p-methylstyrene, 4-propylstyrene, 4-dodecylstyrene, 4-cyclohexylstyrene, 2-ethyl-4-benzylstyrene, 4-(phenylbutyl)styrene, 1-vinylnaphthalene and 2-vinylnaphthalene. Of these, styrene is preferred.

Examples of conjugated dienes which form the block polymer unit (Y) include butadiene, isoprene, pentadiene, 2,3-dimethylbutadiene and combinations thereof. Of these, butadiene, isoprene or a combination of butadiene and isoprene is preferred.

When the conjugated diene rubber block polymer unit (Y) is derived from a combination of butadiene and isoprene, it is preferred that the units derived from isoprene be contained in an amount of at least 40 mol %.

The conjugated diene rubber block polymer unit (Y) composed of butadiene/isoprene copolymer units may be any of butadiene/isoprene random copolymer units, block copolymer units and tapered copolymer units.

The content of aromatic vinyl block polymer unit (X) in the above aromatic vinyl/conjugated diene block copolymer is up to 22% by weight, preferably, in the range of 5 to 22% by weight. This aromatic vinyl polymer unit content can be measured by the customary method such as infrared spectroscopy or NMR spectroscopy.

The melt flow rate (MFR, measured at 200° C. under a load of 2.16 kg in accordance with ASTM D1238) thereof is generally at least 5 g/10 min, preferably, in the range of 5 to 100 g/10 min.

The above aromatic vinyl/conjugated diene block copolymer can be produced by various processes, examples of which include:

(1) method in which an aromatic vinyl compound and a conjugated diene are sequentially polymerized in the presence of an alkyllithium compound such as n-butyllithium as an initiator;

(2) method in which an aromatic vinyl compound and, subsequently, a conjugated diene are polymerized and coupled by a coupling agent; and (3) method in which a conjugated diene and an aromatic vinyl compound are sequentially polymerized in the presence of a lithium compound as an initiator.

The hydrogenated block copolymer (B) for use in the present invention is obtained by hydrogenating the above aromatic vinyl/conjugated diene block copolymer according to the customary procedure, and has the hydrogenation ratio of at least 90%.

The hydrogenation ratio is obtained by defining the case that all the carbon to carbon double bonds of the conjugated diene rubber block polymer unit (Y) are hydrogenated, as 100% of the hydrogenation ratio. In the case of partial hydrogenation, the hydrogenation ratio is expressed as a value relative to the same.

Examples of suitable hydrogenated block copolymers (B) include hydrogenated styrene/isoprene block copolymer (SEP), hydrogenated styrene/isoprene/styrene block copolymer (SEPS, polystyrene/polyethylenepropylene/polystyrene block copolymer), hydrogenated styrene/butadiene block copolymer (SEB) and hydrogenated styrene/butadiene/styrene block copolymer (SEBS, polystyrene/polyethylenebutylene/polystyrene block copolymer). Specifically, there can be mentioned, for example, HYBRAR (trade name, produced by Kuraray Co., Ltd.), Kraton (trade name, produced by Shell Chemical Co., Ltd.), Cariflex TR (trade name, produced by Shell Chemical Co., Ltd.), Solprene (trade name, produced by Phillips Petroleum Co., Ltd.), Europrene SOLT (trade name, produced by Anic S. p. A.), Tufprene (trade name, produced by Asahi Chemical Co., Ltd.), Solprene-T (trade name, produced by Japan Elastomer Co., Ltd.), JSRTR (trade name, produced by Japan Synthetic Rubber Co., Ltd.), Denka STR (trade name, produced by Denki Kagaku Kogyo K.K.), Quintack (trade name, produced by Nippon Zeon Co., Ltd.), Kraton G (trade name, produced by Shell Chemical Co., Ltd.) and Tuftec (trade name, produced by Asahi Chemical Co., Ltd.).

In the present invention, of these, SEBS and SEPS having a content of units derived from an aromatic vinyl of 22% by weight or less and exhibiting a melt flow rate of at least 5 g/10 min are preferably used as the hydrogenated block copolymer (B).

Hydrogenated Block Copolymer (C)

The hydrogenated block copolymer (C) employed as an optional component in the present invention is the same product of hydrogenation of an aromatic vinyl/conjugated diene block copolymer as that in the above component (B), except that the aromatic vinyl/conjugated diene block copolymer contains the aromatic-vinyl block polymer unit derived from an aromatic vinyl in an amount of at least 25% by weight, preferably, 25 to 65% by weight and has a melt flow rate (MFR, measured at 230° C. under a load of 2.16 kg in accordance with ASTM D1238) of up to 10 g/10 min, preferably, 0.01 to 10 g/10 min. It is preferred that the hydrogenation ratio be at least 90%, as in the hydrogenated block copolymer (B).

Aromatic Hydrocarbon Copolymer (D)

The aromatic hydrocarbon copolymer (D) used as an optional component in the present invention is, for example, selected from among polystyrene, polystyrene/acrylonitrile (AS), an ABS resin and polyphenylene oxide (PPO). Of these, polystyrene is preferred.

The melt flow rate (MFR, measured at 230° C. under a load of 2.16 kg in accordance with ASTM D1238) of this aromatic hydrocarbon copolymer (D) preferably ranges from 0.5 to 100 g/10 min.

Crystalline Polyethylene (E)

The crystalline polyethylene (E) used as an optional component in the present invention has a density (ASTM D1505) of 0.895 to 0.975 $g/cm^3$, preferably, 0.900 to 0.970 $g/cm^3$ and a melt flow rate (MFR, measured at 190° C. under a load of 2.16 kg in accordance with ASTM D1238) of 0.5 to 70 g/10 min, preferably, 2 to 50 g/10 min.

As long as the above requirements are satisfied, conventional crystalline polyethylenes can be employed without any particular limitation. The crystalline polyethylene (E) may be ethylene homopolymer or, for example, a random copolymer of ethylene and a small amount of $\alpha$-olefin. For example, the crystalline polyethylene (E) may contain units derived from an $\alpha$-olefin having 3 to 10 carbon atoms in an amount of up to 10 mol %.

For example, ethylene/1-butene copolymer, ethylene/1-hexene copolymer, ethylene/4-methyl-1-pentene copolymer or ethylene/1-octene copolymer can be used as the above ethylene/$\alpha$-olefin random copolymer.

Soft Ethylene/$\alpha$-olefin Copolymer (F)

The soft ethylene/$\alpha$-olefin copolymer (F) used as an optional component in the present invention has a density (ASTM D1505) ranging from 0.860 to less than 0.895 $g/cm^3$, preferably, from 0.860 to 0.890 $g/cm^3$ and a melt flow rate (MFR, measured at 190° C. under a load of 2.16 kg in accordance with ASTM D1238) of 0.5 to 30 g/10 min, preferably, 1 to 20 g/10 min.

The soft ethylene/$\alpha$-olefin copolymer (F) is preferably a random copolymer of ethylene and an $\alpha$-olefin having 3 to 20 carbon atoms, which is elastomeric.

The soft ethylene/$\alpha$-olefin copolymer (F) may contain at least two kinds of units derived from $\alpha$-olefins having 3 to 20 carbon atoms.

It is preferred that the soft ethylene/α-olefin copolymer (F) contain units derived from ethylene in an amount of 60 to 90 mol % and contain units derived from an α-olefin in an amount of 10 to 40 mol %.

Examples of the α-olefins include propylene, 1-butene, 1-pentene, 1-hexene, 1-heptene, 1-octene, 1-decene, 1-dodecene, 1-hexadodecene and 4-methyl-1-pentene. Of these, α-olefins having 3 to 10 carbon atoms are preferred.

The soft ethylene/α-olefin copolymer (F) may contain units derived from at least two members selected from among the above α-olefins and, further, may contain units derived from other polymerizable monomers in an amount not detrimental to the performance desired in the present invention according to necessity.

Examples of the other polymerizable monomers include:

vinyl compounds such as styrene, vinylcyclopentene, vinylcyclohexane and vinylnorbornane;

vinylesters such as vinyl acetate;

unsaturated organic acids and derivatives thereof such as maleic anhydride;

conjugated dienes; and nonconjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylenenorbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,2-norbornadiene.

The soft ethylene/α-olefin copolymer (F) may contain the above units derived from other polymerizable monomers in an amount of up to 10 mol %, preferably, up to 5 mol % and, still preferably, up to 3 mol %.

In the present invention, the soft ethylene/α-olefin copolymer (F) is, for example, selected from among ethylene/propylene copolymer, ethylene/1-butene copolymer, ethylene/propylene/1-butene copolymer, ethylene/propylene/ethylidenenorbornene copolymer, ethylene/1-hexene copolymer and ethylene/1-octene copolymer. Of these, ethylene/propylene copolymer, ethylene/1-butene copolymer, ethylene/1-hexene copolymer and ethylene/1-octene copolymer are preferred. The above copolymers can be used in combination.

The soft ethylene/α-olefin copolymer (F) can be produced by the conventional process in which use is made of, for example, a vanadium catalyst, a titanium catalyst or a metallocene catalyst.

Inorganic Filler (G)

The inorganic filler (G) especially preferably used in the present invention is one having an average particle size of 0.1 to 3 µm, preferably, 0.5 to 2.7 µm.

Examples of suitable inorganic fillers (G) include:

powdery fillers, for example, natural silicic acid or silicates thereof such as particulate talc, kaolinite, calcined clay, pyrophillite, sericite and wollastonite, carbonates such as precipitated calcium carbonate, heavy calcium carbonate and magnesium carbonate, hydroxides such as aluminum hydroxide and magnesium hydroxide, oxides such as zinc oxide, zinc white and magnesium oxide, and synthetic silicic acid or silicates thereof such as hydrous calcium silicate, hydrous aluminum silicate, hydrous silicic acid and silicic acid anhydride;

flake fillers such as mica;

fibrous fillers such as basic magnesium sulfate whisker, calcium titanate whisker, aluminum borate whisker, sepiolite, PMF (Processed Mineral Fiber), xonotlite, potassium titanate and ellestadite; and balloon fillers such as glass balloon and fly ash balloon.

In the present invention, of these, talc is preferably employed.

The average particle size of talc can be measured by the liquid phase sedimentation method.

The inorganic filler (G) for use in the present invention, especially, talc may be one nontreated or surface treated in advance. This surface treatment can be conducted by, for example, a chemical or physical method in which use is made of a treatment such as a silane coupling agent, a higher fatty acid, a metal salt of fatty acid, an unsaturated organic acid, an organic titanate, a resin acid or polyethylene glycol. A propylene polymer composition which is excellent in weld strength, coatability and moldability can be obtained by using talc of which surface has been treated by the above method.

The above inorganic fillers (G) may be used in combination.

Furthermore, in the present invention, organic fillers such as high styrenes, lignin and reclaimed rubber can be used in combination with the above inorganic filler (G).

Polypropylene Resin Composition

The polypropylene resin composition according to the present invention comprises:

50 to 85% by weight, preferably, 50 to 70% by weight of the crystalline polypropylene (A), 2 to 16% by weight, preferably, 5 to 16% by weight of the hydrogenated block copolymer (B), 0 to 16% by weight, preferably, 0 to 14% by weight and, still preferably, 1 to 14% by weight of the hydrogenated block copolymer (C), 0 to 10% by weight, preferably, 0 to 7% by weight and, still preferably, 1 to 7% by weight of the aromatic hydrocarbon copolymer (D), 0 to 10% by weight, preferably, 0 to 7% by weight and, still preferably, 1 to 7% by weight of the crystalline polyethylene (E), 0 to 10% by weight, preferably, 0 to 9% by weight and, still preferably, 1 to 9% by weight of the soft ethylene/α-olefin copolymer (F), and 5 to 25% by weight, preferably, 11 to 22% by weight of the inorganic filler (G) having an average particle size of 0.1 to 3 µm. As mentioned hereinbefore, the components (C), (D), (E) and (F) are optional components and the components (A), (B) and (G) are essential components. Therefore, the present invention comprehends the following embodiments of polypropylene resin compositions:

(1) composition comprising the components (A), (B) and (G);

(2) composition comprising the components (A), (B), (C) and (G);

(3) composition comprising the components (A), (B), (D) and (G);

(4) composition comprising the components (A), (B), (E) and (G);

(5) composition comprising the components (A), (B), (F) and (G);

(6) composition comprising the components (A), (B), (C), (D) and (G);

(7) composition comprising the components-(A), (B), (C), (E) and (G);

(8) composition comprising the components (A), (B), (C), (F) and (G);

(9) composition comprising the components (A), (i), (D), (E) and (G);

(10) composition comprising the components (A), (B), (D), (F) and (G);

(11) composition comprising the components (A), (B), (E), (F) and (G);

(12) composition comprising the components (A), (B), (C), (D), (E) and (G);

(13) composition comprising the components (A), (B), (C), (D), (F) and (G);

(14) composition comprising the components (A), (B), (D), (E), (F) and (G); and

(15) composition comprising the components (A), (B), (C), (D), (E), (F) and (G).

The polypropylene resin composition of the present invention may contain appropriate various additives, other resins and other elastomers according to necessity in such an amount that they are not detrimental to the effects to be exerted in the present invention.

Examples of the additives include antioxidants such as phenolic antioxidants, sulfurous antioxidants and phosphorous antioxidants; hydrochloric acid absorbers; thermal stabilizers; photostabilizers; lubricants; nucleating agents such as aluminum salts of aromatic carboxylic acids, salts of aromatic phosphers and dibenzylidenesorbitol; ultraviolet absorbers; antistatic agents; flame retarders; pigments and dyes; dispersants; copper poison preventives; neutralizers; foaming agents; plasticizers; antifoaming agents; crosslinking agents; fluidity improvers such as peroxides; and weld strength improvers.

Thermoplastic or thermosetting resins can be used as the other resins. Examples thereof include α-olefin homopolymers such as poly-1-butene, copolymers of vinyl compounds and α-olefins other than the above components, modified olefinic polymers such as polypropylene modified with maleic anhydride, nylons, polycarbonates, ABS, polyvinyl chloride, polyphenylene oxide, petroleum resins and phenolic resins.

Conjugated diene rubbers can be mentioned as examples of the other elastomers.

The polypropylene resin composition of the present invention can be obtained by charging the above components either simultaneously or sequentially into, for example, Henschel mixer, a twin-cylinder mixer, a tumbler blender or a ribbon blender, to blend the same and melt kneading the blend by means of, for example, a single screw extruder, a multiple screw extruder, a kneader or Banbury mixer.

The high-quality polypropylene resin composition in which the individual components are dispersed with higher homogeneity can preferably be obtained by the use of a device with superior kneading capability such as a multiple screw extruder, a kneader or Banbury mixer.

The above components can be blended with high dispersibility, so that the homogeneous polypropylene resin composition can be obtained.

In the present invention, the individual components can simultaneously be mixed and kneaded to thereby prepare the composition. Alternatively, a premix (master batch) containing a selected component, for example, an inorganic filler (G) in high concentration may first be prepared, followed by appropriate dilution with the components (A) to (F) so that the concentration of the inorganic filler (G) finally becomes a desired one.

The polypropylene resin composition of the present invention can be molded into items with various configurations by the use of customary molding methods without any particular limitation.

Formation of injection molded items is preferred.

The injection molding of the polypropylene resin composition is generally conducted at a resin temperature of 200 to 250° C. Although depending on the configuration of obtained injection molded items, the injection molding is generally conducted at an injection pressure of 800 to 1400 kg/cm$^2$.

The polypropylene resin composition of the present invention prepared from the above components is excellent in not only heat resistance and rigidity but also impact resistance, especially, brittleness resistance at low temperatures. Moreover, the molded item with beautiful appearance can be obtained, and the painting of the surface of molded item may be avoided.

The above polypropylene resin composition of the present invention is used in automotive inner and outer trims.

EFFECT OF THE INVENTION

The polypropylene resin composition for use in automotive inner and outer trims according to the present invention, which is prepared from the above components, is excellent in not only heat resistance and rigidity but also impact resistance, especially, brittleness resistance at low temperatures. Moreover, the molded item with beautiful appearance can be obtained, and the polypropylene resin composition of the present invention can suitably be used in automotive inner and outer trims.

EXAMPLE

The present invention will now be illustrated with reference to the following Examples, which in no way limit the scope of the invention.

The components used in the Examples and Comparative Examples are as follows:

(A) Crystalline polypropylene:
   A1: propylene block copolymer
      MFR (230° C.)=55 g/10 min,
      ethylene unit content=3.0 mol %,
      ratio of isotactic pentad of a 23° C. n-decane insoluble component=0.984,
      content of a 23° C. n-decane soluble component=8.1% by weight,
      content of ethylene units in a 23° C. n-decane soluble component=37 mol %,
      intrinsic viscosity of a 23° C. n-decane soluble component=8.5 dl/g, and
      crystallinity (X-ray)=59%.
   A2: homopolypropylene
      MFR (230° C.)=60 g/10 min,
      ratio of isotactic pentad to a 23° C. n-decane insoluble component=0.986,
      content of a 23° C. n-decane soluble component=0.7% by weight, and
      crystallinity (X-ray)=62%.

(B) Hydrogenated block copolymer:
   B1: SEBS (Kraton G1657, trade name, produced by Shell Chemical Co., Ltd.),
      MFR (230° C.)=7.1 g/10 min, and content of aromatic vinyl block polymer units=13.2% by weight.
(C) Hydrogenated block copolymer:
C1: SEBS (Kraton G1652, trade name, produced by Shell Chemical Co., Ltd.),
MFR (230° C.)=1.1 g/10 min, and
content of aromatic vinyl block polymer unit=30.4% by weight.
(D) Aromatic hydrocarbon copolymer:
D1: polystyrene (Toporex 550-51, trade name, produced by Mitsui Toatsu Chem. Inc.), and
MFR (230° C.)=5.0 g/10 min.
(E) Crystalline ethylene copolymer:
E1: HDPE (Hizex 2000J, trade name, produced by Mitsui Petrochemical industry Co., Ltd.),
density=0.968 g/cm$^3$, and
MFR (190° C.)=5.5 g/10 min.
(F) Soft ethylene/α-olefin copolymer:
F1: ethylene/1-octene copolymer,
1-octene content=11 mol %, density=0.886 g/cm$^3$, and
MFR (190° C.)=2.1 g/10 min.
(G) Inorganic filler:
G1: talc (Micelton, trade name, produced by Hayashi Kasei K.K.), and
average particle size=1.4 μm.
G2: talc (classified talc, produced by Calseed), and average particle size=4.1 μm.

Examples 1 to 12

The above components were blended in respective amounts specified in Table 1 at 200 to 230° C. by means of a twin screw extruder with a diameter of 30 mm, thereby obtaining polypropylene resin compositions. The melt flow rates (MFR) of the thus obtained polypropylene resin compositions were measured at 230° C. under a load of 2.16 kg in accordance with ASTM D1238.

Subsequently, the obtained polypropylene resin compositions were injection molded by the use of injection molding machine (manufactured by Toshiba Machine Co., Ltd.) which were operated at a cylinder temperature of 210° C. and a mold temperature of 40° C.

The flexural modulus, Izod impact strength, heat distortion temperature, surface hardness and brittle temperature of each of the thus obtained injection molded items were measured in accordance with the following methods, and the appearance thereof was evaluated. The results are shown in Table 1.

(1) Flexural modulus:
measured in accordance with ASTM D790.
(2) Izod impact strength:
measured in accordance with ASTM D256.
(3) Heat distortion temperature (HDT):
measured in accordance with ASTM D648.
(4) Surface hardness:
measured in accordance with ASTM D685 (R scale).
(5) Brittle temperature:
measured in accordance with ASTM D746.
(6) Evaluation of appearance:
2 parts by weight of carbon master batch (PPM 01143 Black, trade name, produced by Toyo Ink Mfg. Co., Ltd.) was dry blended with 100 parts by weight of polypropylene resin composition. The obtained composition was injection molded into a rectangular plate (350 mm length×100 mm width×3 mm thickness). The gate was in the form of a side gate, which was positioned 35 mm from a lengthways end. The appearance was visually evaluated on the following criteria:

A: the occurrence of flow marks is not recognized within a lengthways distance of 300 mm from the position of the gate, B: the occurrence of flow marks is not recognized within a lengthways distance of 280 mm from the position of the gate, and C: flow marks are observed within a lengthways distance of 280 mm from the position of the gate.

The flow mark is a tiger stripe pattern which occurs in a direction perpendicular to the injection flow channel.

Comparative Examples 1 to 6

Polypropylene resin compositions were prepared from the components shown in Table 1 and injection molded in the same manner as in Example 1. The melt flow rates of the obtained polypropylene resin compositions and, further, the flexural modulus, Izod impact strength, heat distortion temperature, surface hardness and brittle temperature of each of the thus obtained injection molded items were measured in the same manner as in Example 1. Moreover, the appearance was evaluated in the same manner as in Example 1. The results are shown in Table 1.

TABLE 1

| | (I) | | | | |
|---|---|---|---|---|---|
| Component (wt %) | Ex. 1 | Comp. Ex. 1 | Ex. 2 | Comp. Ex. 2 | Ex. 3 |
| (A) Crystalline polypropylene | | | | | |
| A-1 | 58 | 58 | | | 59 |
| A-2 | | | 55 | 55 | |
| (B) Hydrogenated block copolymer B-1 | 11 | 11 | 12.5 | 12.5 | 16 |
| (C) Hydrogenated block copolymer C-1 | 11 | 11 | 12.5 | 12.5 | |
| (D) Aromatic hydrocarbon copolymer D-1 | | | | | 5 |
| (E) Crystalline polyethylene E-1 | | | | | |
| (F) Soft ethylene/α-olefin copolymer F-1 | | | | | |
| (G) Inorganic filler | | | | | |
| G-1 | 20 | | 20 | | 20 |
| G-2 | | 20 | | 20 | |
| MFR (g/10 min) | 24.2 | 23.0 | 21.7 | 22.2 | 31.6 |
| Flexural modulus (MPa) | 2250 | 2220 | 2350 | 2340 | 2220 |
| Izod impact strength (J/m) | 470 | 460 | 430 | 390 | 440 |
| Heat distortion temper. (° C.) | 142 | 141 | 143 | 142 | 141 |
| Surface hardness (R scale) | 79 | 78 | 84 | 83 | 82 |
| Brittle temperature (° C.) | −30 | −24 | −27 | −19 | −25 |
| Appearance | A | B | A | C | A |

TABLE 1-continued (II)

| Component (wt %) | Comp. Ex. 3 | Ex. 4 | Comp. Ex. 4 | Ex. 5 |
|---|---|---|---|---|
| (A) Crystalline polypropylene | | | | |
| A-1 | 59 | 64 | 64 | 60 |
| A-2 | | | | |
| (B) Hydrogenated block copolymer B-1 | 16 | 8 | 8 | 8 |
| (C) Hydrogenated block copolymer C-1 | | | | 4 |
| (D) Aromatic hydrocarbon copolymer D-1 | 5 | | | |
| (E) Crystalline polyethylene E-1 | | | | 4 |
| (F) Soft ethylene/α-olefin copolymer F-1 | | 8 | 8 | 4 |
| (G) Inorganic filler | | | | |
| G-1 | | 20 | | 20 |
| G-2 | 20 | | 20 | |
| MFR (g/10 min) | 30.1 | 29.5 | 29.8 | 31.5 |
| Flexural modulus (MPa) | 2170 | 2320 | 2280 | 2210 |
| Izod impact strength (J/m) | 430 | 450 | 420 | 380 |
| Heat distortion temper. (° C.) | 140 | 140 | 140 | 141 |
| Surface hardness (R scale) | 81 | 86 | 80 | 80 |
| Brittle temperature (° C.) | −20 | −14 | −8 | −15 |
| Appearance | A | A | A | A |

(III)

| Component (wt %) | Ex. 6 | Ex. 7 | Ex. 8 | Ex. 9 | Ex. 10 |
|---|---|---|---|---|---|
| (A) Crystalline polypropylene | | | | | |
| A-1 | | | 18 | 8 | 8 |
| A-2 | 74 | 56 | 38 | 48 | 48 |
| (B) Hydrogenated block copolymer B-1 | 16 | 16 | 16 | 12 | 12 |
| (C) Hydrogenated block copolymer C-1 | | 8 | 8 | 6 | 6 |
| (D) Aromatic hydrocarbon copolymer D-1 | | | | 6 | |
| (E) Crystalline polyethylene E-1 | | | | | 6 |
| (F) Soft ethylene/α-olefin copolymer F-1 | | | | | |
| (G) Inorganic filler | | | | | |
| G-1 | 10 | 20 | 20 | 20 | 20 |
| G-2 | | | | | |
| MFR (g/10 min) | 41.9 | 26.3 | 26.1 | 26.6 | 27.1 |
| Flexural modulus (MPa) | 2100 | 2320 | 2290 | 2320 | 2310 |
| Izod impact strength (J/m) | 175 | 350 | 440 | 310 | 330 |
| Heat distortion temper. (° C.) | 145 | 143 | 141 | 141 | 141 |
| Surface hardness (R scale) | 83 | 82 | 78 | 83 | 82 |
| Brittle temperature (° C.) | −14 | −25 | −27 | −23 | −22 |
| Appearance | A | A | A | A | A |

(IV)

| Component (wt %) | Ex. 11 | Ex. 12 | Comp. Ex. 5 | Comp. Ex. 6 |
|---|---|---|---|---|
| (A) Crystalline polypropylene | | | | |
| A-1 | 20 | 20 | | |
| A-2 | 38 | 38 | 74 | 56 |
| (B) Hydrogenated block copolymer B-1 | 6 | 6 | | |
| (C) Hydrogenated block copolymer C-1 | 5 | 5 | 16 | 8 |
| (D) Aromatic hydrocarbon copolymer D-1 | 5 | | | |
| (E) Crystalline polyethylene E-1 | | 5 | | |
| (F) Soft ethylene/α-olefin copolymer F-1 | 6 | 6 | | 16 |
| (G) Inorganic filler | | | | |
| G-1 | 20 | 20 | 10 | 20 |
| G-2 | | | | |
| MFR (g/10 min) | 25.8 | 26.1 | 30.6 | 20.4 |
| Flexural modulus (MPa) | 2340 | 2310 | 2110 | 2260 |
| Izod impact strength (J/m) | 380 | 290 | 100 | 260 |
| Heat distortion temper. (° C.) | 143 | 142 | 146 | 142 |
| Surface hardness (R scale) | 83 | 82 | 84 | 77 |
| Brittle temperature (° C.) | −23 | −24 | −1 | −4 |
| Appearance | A | A | A | A |

What is claimed is:

1. A polypropylene resin composition for use in automotive inner and outer trims, comprising:

50 to 85% by weight of a crystalline polypropylene (A) having a melt flow rate (230° C. under a load of 2.16 kg) of 7 to 70 g/10 min, 2 to 16% by weight of a hydrogenated block copolymer (B) obtained by hydrogenating at a hydrogenation ratio of at least 90% an aromatic vinyl/conjugated diene block copolymer which contains an aromatic vinyl block polymer unit derived from an aromatic vinyl in an amount of 22% by weight or less and has a melt flow rate (230° C. under a load of 2.16 kg) of at least 5 g/10 min, 0 to 16% by weight of a hydrogenated block copolymer (C) obtained by hydrogenating at a hydrogenation ratio of at least 90% an aromatic vinyl/conjugated diene block copolymer which contains an aromatic vinyl block polymer unit derived from an aromatic vinyl in an amount of at least 25% by weight and has a melt flow rate (230° C. under a load of 2.16 kg) of 10 g/10 min or less, 1 to 10% by weight of an aromatic hydrocarbon copolymer (D), 0 to 10% by weight of a crystalline polyethylene (E), 0 to 10% by weight of a soft ethylene/α-olefin copolymer (F), and 5 to 25% by weight of an inorganic filler (G) having an average particle size of 0.1 to 3 μm.

2. The polypropylene resin composition as claimed in claim 1, wherein the crystalline polypropylene (A) is a crystalline ethylene/propylene block copolymer, said crystalline ethylene/propylene block copolymer containing ethylene units in an amount of 0.5 to 8 mol % and containing a 23° C. n-decane insoluble component having a ratio of isotactic pentad of at least 0.970.

3. The polypropylene resin composition as claimed in claim 2, wherein the crystalline ethylene/propylene block copolymer contains in an amount of 4 to 20% by weight the 23° C. n-decane soluble component, said 23° C. n-decane soluble component containing ethylene units in an amount of 20 to 45 mol % and having an intrinsic viscosity [η] measured in 135° C. decalin of at least 4 dl/g.

4. The polypropylene resin composition as claimed in claim 1, wherein the aromatic hydrocarbon copolymer (D) is a polystyrene having a melt flow rate (230° C. under a load of 2.16 kg) of 0.5 to 100 g/10 min.

5. The polypropylene resin composition as claimed in claim 1, wherein the crystalline polyethylene (E) is any of ethylene homopolymer, ethylene/1-butene copolymer, ethylene/1-hexene copolymer, ethylene/4-methyl-1-pentene copolymer and ethylene/1-octene copolymer, these homopolymer and copolymers having a density of 0.895 to 0.975 g/cm$^3$ and a melt flow rate (190° C. under a load of 2.16 kg) of 0.5 to 70 g/10 min.

6. The polypropylene resin composition as claimed in claim 1, wherein the soft ethylene/α-olefin copolymer (F) is any of ethylene/propylene copolymer, ethylene/1-butene copolymer, ethylene/1-hexene copolymer and ethylene/1-octene copolymer, these copolymers having a density ranging from 0.860 to less than 0.895 g/cm$^3$ and a melt flow rate (190° C. under a load of 2.16 kg) of 0.5 to 30 g/10 min.

7. The polypropylene resin composition as claimed in claim 1, wherein the inorganic filler (G) is talc.

8. A polypropylene resin composition for use in automotive inner and outer trims, comprising:

50 to 85% by weight of a crystalline polypropylene (A) having a melt flow rate (230° C. under a load of 2.16 kg) of 7 to 70 g/10 min, 2 to 16% by weight of a hydrogenated block copolymer (B) obtained by hydrogenating at a hydrogenation ratio of at least 90% an aromatic vinyl/conjugated diene block copolymer which contains an aromatic vinyl block polymer unit derived from an aromatic vinyl in an amount of 22% by weight or less and has a melt flow rate (230° C. under a load of 2.16 kg) of at least 5 g/10 min, 1 to 16% by weight of a hydrogenated block copolymer (C) obtained by hydrogenating at a hydrogenation ratio of at least 90% aromatic vinyl/conjugated diene block copolymer which contains an aromatic vinyl block polymer unit derived from an aromatic vinyl in an amount of at least 25% by weight and has a melt flow rate (230° C. under a load of 2.16 kg) of 10 g/10 min or less, 0 to 10% by weight of an aromatic hydrocarbon copolymer (D), 1 to 10% by weight of a crystalline polyethylene (E), 0 to 10% by weight of a soft ethylene/α-olefin copolymer (F), and 5 to 25% by weight of an inorganic filler (G) having an average particle size of 0.1 to 3 μm.

9. The polypropylene resin composition as claimed in claim 8, wherein the crystalline polypropylene (A) is a crystalline ethylene/propylene block copolymer, said crystalline ethylene/propylene block copolymer containing ethylene units in an amount of 0.5 to 8 mol % and containing a 23° C. n-decane insoluble component having a ratio of isotactic pentad of at least 0.970.

10. The polypropylene resin composition as claimed in claim 9, wherein the crystalline ethylene/propylene block copolymer contains in an amount of 4 to 20% by weight the 23° C. n-decane soluble component, said 23° C. n-decane soluble component containing ethylene units in an amount of 20 to 45 mol % and having an intrinsic viscosity (η) measured in 135° C. decalin of at least 4 dl/g.

11. The polypropylene resin composition as claimed in claim 8, wherein the aromatic hydrocarbon copolymer (D) is a polystyrene having a melt flow rate (230° C. under a load of 2.16 kg) of 0.5 to 100 g/10 min.

12. The polypropylene resin composition as claimed in claim 8, wherein the crystalline polyethylene (E) is any of ethylene homopolymer, ethylene/1-butene copolymer, ethylene/1-hexene copolymer, ethylene/4-methyl-1-pentene copolymer and ethylene/1-octene copolymer, these homopolymer and copolymers having a density of 0.895 to 0.975 g/cm$^3$ and a melt flow rate (190° C. under a load of 2.16 kg) of 0.5 to 70 g/10 min.

13. The polypropylene resin composition as claimed in claim 8, wherein the soft ethylene/α-olefin copolymer (F) is any of ethylene/propylene copolymer, ethylene/1-butene copolymer, ethylene/1-hexene copolymer and ethylene/1-octene copolymer, these copolymers having a density ranging from 0.860 to less than 0.895 g/cm$^3$ and a melt flow rate (190° C. under a load of 2.16 kg) of 0.5 to 30 g/10 min.

14. The polypropylene resin composition as claimed in claim 8, wherein the inorganic filler (G) is talc.

15. An automotive inner and outer trim polypropylene resin composition, comprising:

50 to 85% by weight of a crystalline polypropylene (A) having a melt flow rate (230° C. under a load of 2.16 kg) of 7 to 70 g/10 min, 5 to 16% by weight of a hydrogenated block copolymer (B) obtained by hydrogenating at a hydrogenation ratio of at least 90% an aromatic vinyl/conjugated diene block copolymer which contains an aromatic vinyl block polymer unit derived from an aromatic vinyl in an amount of 5 to 22% and has a melt flow rate (230° C. under a load of 2.16 kg) of 5–100 g/10 min, 1 to 14% by weight of a hydrogenated block copolymer (C) obtained by hydrogenating at a hydrogenation ratio of at least 90% an aromatic vinyl/conjugated diene block copolymer which contains an aromatic vinyl block polymer unit derived from an aromatic vinyl of 25–65% by weight and has a melt flow rate (230° C. under a load of 2.16 kg) of 0.1 to 10 g/10 min, 0 to 10% by weight of an aromatic hydrocarbon copolymer (D), 1 to 10% by weight of a crystalline polyethylene (E), 0 to 10% by weight of a soft ethylene/α-olefin copolymer (F), and 5 to 25% by weight of an inorganic filler (G) having an average particle size of 0.1 to 3 μm.

16. The polypropylene resin composition as claimed in claim 15, wherein the crystalline polypropylene (A) is a crystalline ethylene/propylene block copolymer, said crystalline ethylene/propylene block copolymer containing ethylene units in an amount of 0.5 to 8 mol % and containing a 23° C. n-decane insoluble component having a ratio of isotactic pentad of at least 0.970.

17. The polypropylene resin composition as claimed in claim 16, wherein the crystalline ethylene/propylene block copolymer contains in an amount of 4 to 20% by weight the 23° C. n-decane soluble component, said 23° C. n-decane soluble component containing ethylene units in an amount of 20 to 45 mol % and having an intrinsic viscosity (η) measured in 135° C. decalin of at least 4 dl/g.

18. The polypropylene resin composition as claimed in claim 15, wherein the aromatic hydrocarbon copolymer (D) is a polystyrene having a melt flow rate (230° C. under a load of 2.16 kg) of 0.5 to 100 g/10 min.

19. The polypropylene resin composition as claimed in claim 15, wherein the crystalline polyethylene (E) is any of ethylene homopolymer, ethylene/1-butene copolymer, ethylene/1-hexene copolymer, ethylene/4-methyl-1-pentene copolymer and ethylene/1-octene copolymer, these homopolymer and copolymers having a density of 0.895 to 0.975 g/cm$^3$ and a melt flow rate (190° C. under a load of 2.16 kg) of 0.5 to 70 g/10 min.

20. The polypropylene resin composition as claimed in claim 15, wherein the soft ethylene/α-olefin copolymer (F) is any of ethylene/propylene copolymer, ethylene/1-butene copolymer, ethylene/1-hexene copolymer and ethylene/1-octene copolymer, these copolymers having a density ranging from 0.860 to less than 0.895 g/cm$^3$ and a melt flow rate (190° C. under a load of 2.16 kg) of 0.5 to 30 g/10 min.

21. The polypropylene resin composition as claimed in claim 15, wherein the inorganic filler (G) is talc.

* * * * *